United States Patent Office 2,905,689
Patented Sept. 22, 1959

2,905,689
PROCESS FOR PREPARING RHODANINES

Isaac Benghiat, Bronx, N.Y., assignor to Stauffer Chemical Company, a corporation of Delaware No Drawing. Application September 9, 1957
Serial No. 682,601

12 Claims. (Cl. 260—306.7)

This invention relates to the preparation of 3-substituted rhodanines, said compounds having the following general formula:

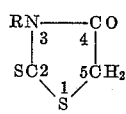

where R represents a monovalent organic radical.

The present invention rests on the discovery that 3-substituted rhodanines of the above general formula can readily be prepared in excellent yield and in a high degree of purity by reacting thioglycolic acid $$(HSCH_2COOH)$$

with an isothiocyanate having the general formula RNCS (where R is a monovalent organic radical) in the presence of a strong base, as catalyst, and preferably with the use of benzene or other water-immiscible liquid as the solvent. This reaction can be represented as follows:

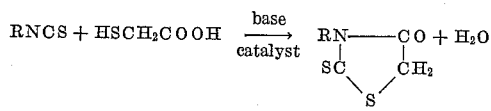

Thus, when R is a methyl group, the one reactant will be methylisothiocyanate and the product will be rhodanine. Other representative radicals represented above by R comprise alkyl and alkenyl groups (e.g., ethyl, n- or isopropyl, the various butyl groups, hexyl, heptenyl, vinyl, allyl, butenyl or the like), aryl, alkaryl or arylalkyl groups (e.g., benzyl, phenyl, naphthyl, p-nitrophenyl, tolyl, and the like).

The above reaction, per se, is already known in the art. However, the use of a catalyst has not been reported. It has been found that in the absence of a catalyst, the reaction proceeds poorly and considerable quantities of starting materials are present at the end of the reaction. As a result, it is necessary to remove the unreacted isothiocyanate by steam distillation. The rhodanine which remains in the residue is present in only small amounts and is contaminated by thioglycolic acid. In contrast, we have found that by use of a catalyst, the reaction proceeds rapidly and the product is formed in high purity and good yield.

As regards the catalyst, good results are obtained with the various alkali metal hydroxides, though these materials have the disadvantage, when employed in excess, of combining with the intermediate carboxymethyl dithiocarbamate formed during the reaction, to form a salt. However, the rhodanine derivative corresponding to said salt is readily obtained from the latter by acidification and heating. Other suitable catalysts comprise the various tertiary amines, as well as quaternary ammonium compounds of basic character. Representative nitrogen-containing catalysts are, for example, N,N-dimethylaniline, pyridine, benzyl-trimethylammonium hydroxide, and the like. In general, the use of tertiary amines (including those such as pyridine wherein the nitrogen atom is present in an aromatic nucleus) and of quaternary ammonium hydroxides is preferred in carrying out the present invention.

As regards the water-immiscible solvent, good results have been obtained with benzene and similar liquids (e.g., toluene, xylenes, naphthas, and the like) which, in addition to being immiscible with water, dissolve the various reactants, as well as the rhodanine products formed during the reaction. Other well-known solvents will suggest themselves to those skilled in the art, as being adapted for use in the process of this invention. It should be noted that the use of a water-immiscible solvent permits the operator to readily follow the progress of the reaction since the water formed separates as an aqueous layer which may be withdrawn and measured as the reaction progresses, or at its conclusion. The rhodanine product can then be readily recovered by known methods from the remaining non-aqueous portion of the system.

From the standpoint of reactant and catalyst proportions, good results are obtained by employing substantially equimolar proportions of the respective isothiocyanate and thioglycolic acid reactants, by which it is meant the use of said reactants in proportions such that neither is present in more than about 25% excess. In this connection, it will be noted that the thioglycolic acid reactant is present in slight excess in various of the working examples given herein, such excess being preferred. The base catalyst is effective when employed in amounts as small as 1 mole percent, based on the total number of moles of reactants present. However, a preferred practice is to employ a reaction mixture containing from about 5 to 25 mole percent of the base.

It is considered that the nature of the present invention will be the more fully understood by a consideration of the following examples which illustrate the invention in various of its embodiments.

Example 1.—A solution of 27 g. phenyl isothiocyanate (0.2 M), 13.8 g. of thioglycolic acid (0.18 M), 100 ml. benzene and 8 ml. of pyridine was refluxed. A Dean-Stark tube was used to separate the water as it formed. When water no longer separated, the mixture was allowed to cool. The product was separated by filtration and washed with a small amount of benzene. The yield of 3-phenyl rhodanine, M.P. 188–194° C., was 30.5 g. or 81% of theoretical. Holmberg, J. prakt. chem. [2], 79, 288 (1909), reports a M.P. of 192–193° C.

Example 2.—A mixture of 13.5 g. phenyl isothiocyanate (0.1 M), 10.1 g. thioglycolic acid (0.11 M), 200 ml. of benzene, 5 ml. of triethylamine, was treated as in Example 1. 17.5 g. of product (89%), M.P. 191–192° C., were obtained.

Example 3.—A mixture of 13.5 g. phenyl isothiocyanate (0.1 M), 10.1 g. thioglycolic acid (0.11 M), 200 ml. of benzene, 5 g. of an ion-exchange resin having strong basic properties (Amberlite IRA-400 (OH)), was used in place of the amine of Example 2. The product was separated from the resin by continuous extraction with benzene. 18 g. of product (86%), M.P. 195–197° C., were obtained.

Example 4.—A mixture of 18 g. p-nitrophenyl isothiocyanate (0.1 M), 10.1 g. thioglycolic acid (0.11 M), 200 ml. benzene and 2 ml. pyridine was refluxed using a Dean-Stark tube until water no longer separated. The mixture was allowed to cool. The solid was separated by filtration and recrystallized from a mixture of 210 ml. of ethyl acetate and 40 ml. of ethanol. 20.4 g. of 3-(p-nitrophenyl) rhodanine (80.3%), M.P. 232–234° C., were obtained.

It is to be noted that when the reaction was repeated without a catalyst, and using aqueous $CH_3OH$ as the solvent, the yield was but 29% and purification of the product was very difficult.

*Example 5.*—A mixture of 14.6 g. of methyl isothiocyanate (0.2 M), 20.2 g. of thioglycolic acid (0.22 M), 5 ml. of triethylamine and 400 ml. benzene was refluxed using a Dean-Stark tube. The benzene solution was allowed to cool. It was then washed successively with dilute hydrochloric acid and water. The benzene was removed by distillation on a steam bath. 28 g. of 3-methyl rhodanine (89%), M.P. 71–72° C., remained as a residue.

*Example 6.*—A solution of 5 g. sodium hydroxide (0.125 M) in 100 ml. water was added to a solution of 13.5 g. phenyl isothiocyanate and 10.1 g. thioglycolic acid in 100 ml. ethanol. The mixture turned yellow and warmed spontaneously. A solid separated. The mixture was allowed to stand at room temperature overnight. The mixture was poured into water and acidified with hydrochloric acid. The intermediate S-carboxymethyl phenyldithiocarbamate separated. It was cyclized by heating at 150° C. 11.3 g. of 3-phenyl rhodanine (54%), M.P. 192–193° C., were obtained.

*Example 7.*—In this operation, the procedure of Example 6 was repeated except that 5 ml. of a 35% solution of benzyltrimethylammonium hydroxide in methanol was used in place of the sodium hydroxide, and the mixture was refluxed for five hours. The mixture was allowed to cool. The product was separated by filtration. 18.4 g. of 3-phenyl rhodanine (88%), M.P. 194–195° C., were obtained.

The foregoing Examples 6 and 7 imposed more difficult problems of product separation than did the procedures of Examples 1–5, where benzene was employed as solvent. Further, the relative advantages obtained by employing a strong nitrogen base (particularly as regards a still further improved yield) rather than caustic, are apparent from a comparison of the data of Examples 6 and 7.

I claim:

1. In the process for reacting thioglycolic acid with an isothiocyanate having the general formula RNCS to form a rhodanine having the general formula

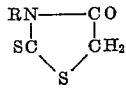

R in said formula being selected from the group consisting of lower alkyl, lower alkenyl, phenyl, lower alkyl-substituted phenyl, nitro-substituted phenyl, benzyl and naphthyl, the improvement which comprises carrying out the reaction in the presence of a catalyst selected from the group consisting of alkali metal hydroxides, tertiary amines and quaternary ammonium compounds of basic character and ion exchange resins of basic character.

2. The process of claim 1 wherein the reaction is effected in a hydrocarbon which for said rhodanine is a water-immiscible solvent.

3. The process of claim 2 wherein the solevnt is benzene.

4. A method for preparing 3-organo rhodanines which comprises contacting in a solvent thioglycolic acid with an isothiocyanate having the general formula RNCS, where R is selected from the group consisting of lower alkyl, lower alkenyl, phenyl, lower alkyl-substituted phenyl, nitro-substituted phenyl, benzyl and naphthyl, said R being the substituent which appears in the 3-position of the rhodanine product, in the presence of a catalyst selected from the group consisting of alkali metal hydroxides, tertiary amines, quaternary ammonium compounds of basic character and ion exchange resins of basic character and refluxing until water ceases to form.

5. The method of claim 4 wherein the catalyst is a tertiary amine.

6. The method of claim 4 wherein the catalyst is a quaternary ammonium compound of basic character.

7. The method of claim 4 wherein the reaction is effected in a hydrocarbon which is a water-immiscible solvent for said rhodanine and wherein the catalyst is a tertiary amine.

8. The method of claim 4 wherein the reaction is effected in a hydrocarbon which is a water-immiscible solvent for said rhodanine and wherein the catalyst is a quaternary ammonium compound of basic character.

9. A method for preparing 3-phenyl rhodanine which comprises contacting in a benzene solvent thioglycolic acid with phenyl isothiocyanate in the presence of a pyridine catalyst.

10. A method for preparing 3-phenyl rhodanine which comprises contacting in a benzene solvent thioglycolic acid with phenyl isothiocyanate in the presence of a triethylamine catalyst.

11. A method for preparing 3-(p-nitrophenyl)rhodanine which comprises contacting in a benzene solvent thioglycolic acid with p-nitrophenyl isothiocyanate in the presence of a pyridine catalyst.

12. A method for preparing 3-methyl rhodanine which comprises contacting in a benzene solvent thioglycolic acid with methyl isothiocyanate in the presence of a triethylamine catalyst.

References Cited in the file of this patent

Elderfield: Heterocyclic Compounds, vol. 5, John Wiley and Sons, New York, pp. 714–715 (1957).

Holmberg: J. Pract Chem., vol. 81, pp. 451–454 (1910).

Holmberg: J. Pract. Chem., vol. 84, pp. 651–652 (1913).